US012640922B2

(12) United States Patent
Isshiki et al.

(10) Patent No.: US 12,640,922 B2
(45) Date of Patent: May 26, 2026

(54) MATCHING SYSTEM, MATCHING APPARATUS, MATCHING METHOD, AND PROGRAM

(71) Applicant: NEC Corporation, Tokyo (JP)

(72) Inventors: Toshiyuki Isshiki, Tokyo (JP); Kengo Mori, Tokyo (JP); Haruna Fukuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 85 days.

(21) Appl. No.: 18/848,222

(22) PCT Filed: Mar. 23, 2022

(86) PCT No.: PCT/JP2022/013466
§ 371 (c)(1),
(2) Date: Sep. 18, 2024

(87) PCT Pub. No.: WO2023/181163
PCT Pub. Date: Sep. 28, 2023

(65) Prior Publication Data
US 2025/0211439 A1      Jun. 26, 2025

(51) Int. Cl.
*H04L 9/30*          (2006.01)
*H04L 9/00*          (2022.01)
*H04L 9/08*          (2006.01)

(52) U.S. Cl.
CPC ............ *H04L 9/3073* (2013.01); *H04L 9/008* (2013.01); *H04L 9/0866* (2013.01)

(58) Field of Classification Search
None
See application file for complete search history.

(56) References Cited

U.S. PATENT DOCUMENTS 11,128,462 B2 * 9/2021 Higo ..................... H04L 9/0643
2013/0318351 A1 11/2013 Hirano et al.
(Continued)

FOREIGN PATENT DOCUMENTS

JP          6962629 B1 * 11/2021 ......... G06F 21/6245
WO       2019/130528 A1    8/2012
(Continued)

OTHER PUBLICATIONS

International Search Report for PCT Application No. PCT/JP2022/013466, mailed on Jun. 7, 2022.
(Continued)

*Primary Examiner* — Joseph P Hirl
*Assistant Examiner* — Hassan Saadoun
(74) *Attorney, Agent, or Firm* — Sughrue Mion, PLLC

(57) ABSTRACT

A (secure) matching system includes a user-side apparatus; and a service-side apparatus. The user-side apparatus includes a user key generation part and a registration part that registers a registration ciphertext in the service-side apparatus. The service-side apparatus includes a service key generation part, a conversion key generation part that generates a conversion key for converting a first ciphertext encrypted with a service public key into a second ciphertext encrypted with a user public key without executing a decryption process, and a matching part. The service-side apparatus generates a second ciphertext with the conversion key after generating a first ciphertext obtained by encrypting features used as a matching source with the service public key and matches the second ciphertext against a registered ciphertext.

18 Claims, 6 Drawing Sheets

(56) References Cited

U.S. PATENT DOCUMENTS

| 2015/0043735 A1* | 2/2015 | Fujii ......................... H04L 9/14 |
| | | 380/277 |
| 2018/0278410 A1 | 9/2018 | Hirano et al. |
| 2020/0344049 A1 | 10/2020 | Yasuda et al. |
| 2020/0358611 A1* | 11/2020 | Hoang ................... G06N 3/045 |
| 2022/0012359 A1* | 1/2022 | Burceanu ............ G06F 21/6245 |
| 2022/0050999 A1* | 2/2022 | Zheng ................... G06N 3/045 |
| 2023/0370248 A1* | 11/2023 | Imabayashi ........... H04L 9/0825 |

FOREIGN PATENT DOCUMENTS

| WO | 2012/114452 A1 | 7/2014 |
| WO | 2014/010202 A1 | 6/2016 |
| WO | 2017/061024 A1 | 10/2017 |

OTHER PUBLICATIONS

ISO/IEC DIS 24745:2020(E), "Information security, cybersecurity and privacy protection—Biometric information protection", pp. 1-70.
Keita Xagawa, Keisuke Tanaka, "Proxy Re-Encryption based on Learning with Errors", SCIS 2010, pp. 1-6.

* cited by examiner

MATCHING SYSTEM, MATCHING APPARATUS, MATCHING METHOD, AND PROGRAM

This application is a National Stage Entry of PCT/JP2022/013466 filed on Mar. 23, 2022, the contents of all of which are incorporated herein by reference, in their entirety.

FIELD

The present invention relates to a matching system, a matching apparatus, a matching method, and a program.

BACKGROUND

There is an encryption technique referred to as "homomorphic encryption". When ciphertexts $Enc(m_1)$ and $Enc(m_2)$ of plaintexts $m_1$ and $m_2$ are given, the homomorphic encryption enables calculation of a ciphertext $Enc(m_1 \circ m_2)$ of a binary operation $m_1 \circ m_2$ of the plaintexts $m_1$ and $m_2$, without decrypting the ciphertexts $Enc(m_1)$ and $Enc(m_2)$. The above "$\circ$" represents a binary operation such as addition "+" or multiplication "x". The homomorphic encryption regarding addition "+" is referred to as "additive homomorphic encryption", and the homomorphic encryption regarding multiplication "x" is referred to as "multiplicative homomorphic encryption". The homomorphic encryption having homomorphism regarding both addition "+" and multiplication "x" is referred to as "fully homomorphic encryption".

Since the fully homomorphic encryption has homomorphism regarding both addition "+" and multiplication "x", it is known that the fully homomorphic encryption can process arbitrary operations on encrypted data. However, because the fully homomorphic encryption requires a large calculation amount, it is difficult to use the fully homomorphic encryption practically. Against this background, development has been made on a homomorphic encryption having an intermediate property between the additive homomorphic encryption and the fully homomorphic encryption. For example, an encryption method referred to as "Somewhat homomorphic encryption" is a homomorphic encryption having homomorphism regarding an arbitrary number of additions and an finite number of multiplications (see NPL 1, for example). In addition, for example, an encryption method referred to as "two-level homomorphic encryption" is a homomorphic encryption that enables a single homomorphic multiplication and an arbitrary number of homomorphic additions. For example, although these Somewhat homomorphic encryption and two-level homomorphic encryption restrict their respective tolerable operations, these encryptions need a lass calculation amount than that of the fully homomorphic encryption. Thus, the calculation amount can be reduced by selecting and implementing a suitable homomorphic encryption, depending on the purpose.

There is a similarity calculation as an encryption protocol using such a homomorphic encryption. For example, in biometric authentication, if the similarity of features extracted from a biological body such as a face or a fingerprint falls within a predetermined range, successful authentication is determined. In the biometric authentication using the homomorphic encryption, the similarity of encrypted features used for the authentication can be calculated without decrypting the encrypted features. Therefore, the homomorphic encryption is suitable in ensuring the security required by the biometric authentication. Registered information in the biometric authentication is biological features. If these biological features are leaked, there is a possibility that impersonation occurs not only in this authentication system but also in other biometric authentication systems using the same method. Thus, in the biometric authentication using the homomorphic encryption, there are cases in which a ciphertext of biological features that only the corresponding user can decrypt needs to be transmitted to a service provider, the user needs to manage his or her secret key, and the user needs to execute a decryption process (for example, NPL 1).

NPL1: Information security, cybersecurity and privacy protection-Biometric information protection (ISO/IEC DIS 24745:2020(E))

NPL2: Keita Xagawa, Keisuke Tanaka "Proxy Re-Encryption based on Learning with Errors" (The 2010 Symposium on Cryptography and Information Security Jan. 19-22, 2010)

SUMMARY

The disclosure of each of the literatures in the above citation list is incorporated herein by reference thereto. The following analysis has been made by the present inventors.

An operation between ciphertexts encrypted by a homomorphic encryption presupposes that these ciphertexts have been encrypted by the same public key. The homomorphic operation cannot be executed correctly on the ciphertexts encrypted by different public keys.

Meanwhile, because it is desirable that each user have and mange a different secret key from the viewpoint of security, each user has a different public key associated with his or her secret key. Thus, in the authentication phase in biometric authentication, after extracted biological features of a user are encrypted by his or her public key, it is necessary to execute similarity calculation by using a homomorphic operation. However, in the authentication phase in biometric authentication, because the individual person cannot be determined yet, the biometric authentication system cannot determine which public key needs to be used for the encryption.

A solution to this problem is to have the user subjected to the biometric authentication transmit his or her public key. However, even if the user transmits his or her public key, the sender of the public key and the user subjected to the biometric authentication need to be associated with each other. This is not always easy when a plurality of people are authenticated at the same time.

Another solution is to encrypt data with the public keys of all the users in a brute-force manner and to execute homomorphic operations. That is, when data of N people is registered as the features used for biometric authentication, the features are encrypted with the public keys of the N people, and a number N of similarity calculations are executed. One of these N similarity calculations is calculated correctly, and if a similarity falls within a predetermined range, successful authentication is determined.

However, when the features are encrypted with the public keys of all the users in a brute-force manner as described above, the biological features remain as plaintexts for a long time, and there is a risk of an attack in this period of time. When the features are encrypted with the public keys of the N people, the time in which the biological features remain as plaintexts becomes N times of the time needed for a single encryption. Even when the time needed for a single encryption is very short, the time in which the biological features remain as plaintexts becomes an unignorable length as the number of registered people increases.

In view of the above problems, an object of the present invention is to provide a matching system, a matching apparatus, a matching method, and a program that contribute to, when plaintexts are encrypted in order to execute homomorphic operations between (among) a plurality of ciphertexts encrypted with different keys, shortening the time in which the plurality of corresponding features remain as plaintexts.

According to a first aspect of the present invention, there is provided a matching system, including: a user-side apparatus; and a service-side apparatus; wherein the user-side apparatus includes: a user key generation part that generates a pair of a user public key and a user secret key, and a registration part that registers a registration ciphertext obtained by encrypting a plurality of features used as a matching destination with the user public key in the service-side apparatus; wherein the service-side apparatus includes: a service key generation part that generates a pair of a service public key and a service secret key, a conversion key generation part that generates a conversion key for converting a first ciphertext encrypted with the service public key into a second ciphertext encrypted with the user public key without executing a decryption process, by using the user public key and the service secret key, and a matching part that matches the second ciphertext against the registered ciphertext; and wherein the service-side apparatus generates a second ciphertext with the conversion key after generating a first ciphertext obtained by encrypting features used as a matching source with the service public key and matches the second ciphertext against a registered ciphertext.

According to a second aspect of the present invention, there is provided a matching apparatus, including: a service key generation part that generates a pair of a service public key and a service secret key; a conversion key generation part that generates, by using a plurality of user public keys and the service secret key, conversion keys, each of which is for converting a first ciphertext encrypted with the service public key into a second ciphertext encrypted with a corresponding one of the user public keys without executing a decryption process; a registration part that obtains a registration ciphertext by encrypting a plurality of features used as a matching destination with a corresponding user public key; an encryption part that receives matching target features and obtains a first ciphertext by encrypting the features with the service public key; a re-encryption part that converts the first ciphertext into the second ciphertext with the conversion key; and a matching part that matches the second ciphertext against the registered ciphertext.

According to a third aspect of the present invention, there is provided a matching method, including: generating a pair of a user public key and a user secret key; generating a pair of a service public key and a service secret key; generating a conversion key for converting a first ciphertext encrypted with the service public key into a second ciphertext encrypted with the user public key without executing a decryption process, by using the user public key and the service secret key; obtaining a registration ciphertext by encrypting a plurality of features used as a matching destination with the user public key; receiving features used as a matching source, and obtaining the first ciphertext by encrypting the features with the service public key; converting the first ciphertext into the second ciphertext with the conversion key; and matching the second ciphertext against the registered ciphertext.

According to a fourth aspect of the present invention, there is provided a program, causing a computer to execute: processing for generating a pair of a user public key and a user secret key; processing for generating a pair of a service public key and a service secret key; processing for generating a conversion key for converting a first ciphertext encrypted with the service public key into a second ciphertext encrypted with the user public key without executing a decryption process, by using the user public key and the service secret key; processing for obtaining a registration ciphertext by encrypting a plurality of features used as a matching candidate with the user public key; processing for receiving features used as a matching target, and obtaining the first ciphertext by encrypting the features with the service public key; processing for converting the first ciphertext into the second ciphertext with the conversion key; and processing for matching the second ciphertext against the registered ciphertext. This program can be recorded in a computer-readable storage medium. The storage medium may be a non-transient storage medium such as a semiconductor memory, a hard disk, a magnetic recording medium, or an optical recording medium. The present invention can be embodied as a computer program product.

According to the individual aspects of the present invention, there are provided a matching system, a matching apparatus, a matching method, and a program that contribute to, when plaintexts are encrypted in order to execute homomorphic operations between (among) a plurality of ciphertexts encrypted with different keys, shortening the time in which the plurality of corresponding features remain as plaintexts.

EXAMPLE EMBODIMENTS

Figure 1:
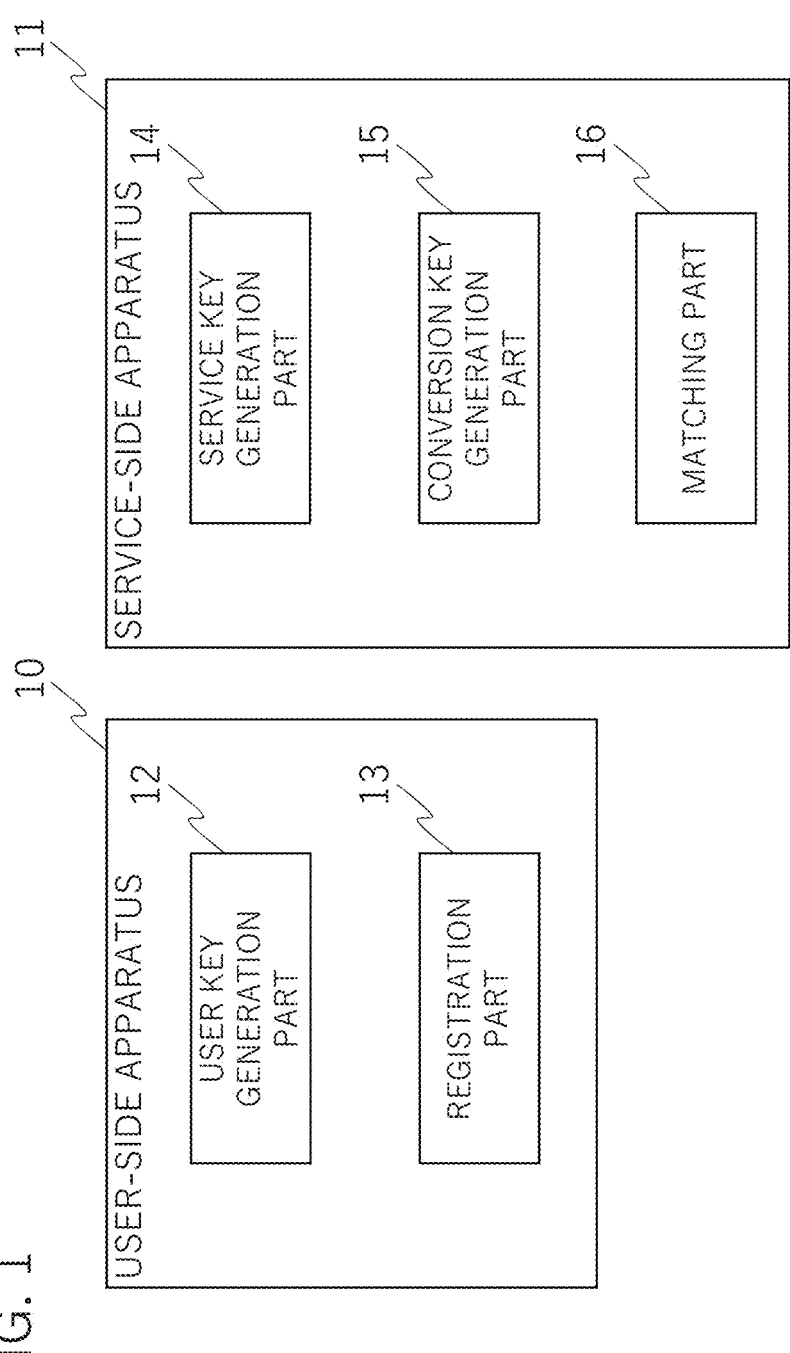
FIG. 1 is a block diagram illustrating a schematic configuration example of a secure matching system according to a first example embodiment.

Hereinafter, example embodiments of a secure matching system, a secure matching apparatus, a secure matching method, and a program that embody the present invention will be described with reference to drawings. However, the present invention is not limited to the following example embodiments. In addition, in the individual drawings, the same or equivalent elements are denoted by the same reference characters, as needed. The drawings are schematical drawings, and it should be noted that the size relationship among the elements, the ratio of the individual element, etc., may differ from the actual relationship, ratio, etc. These size relationship and ratio may differ between different drawings.

First Example Embodiment

Hereinafter, a secure matching system according to a first example embodiment will be described with reference to FIG. 1. The first example embodiment is an example embodiment mainly for describing a basic concept of the present invention.

FIG. 1 is a block diagram illustrating a schematic configuration example of the secure matching system according to the first example embodiment. As illustrated in FIG. 1, the secure matching system according to the first example embodiment includes a user-side apparatus 10 and a service-side apparatus 11. The user-side apparatus 10 includes a user key generation part 12 and a registration part 13. The service-side apparatus 11 includes a service key generation part 14, a conversion key generation part 15, and a matching part 16.

The user key generation part 12 in the user-side apparatus 10 generates a pair of a user public key and a user secret key. The registration part 13 in the user-side apparatus 10 registers a registration ciphertext obtained by encrypting a plurality of features used as a matching destination with a corresponding user public key in the service-side apparatus 11. The service key generation part 14 in the service-side apparatus 11 generates a pair of a service public key and a service secret key. By using the user public key and the service secret key, the conversion key generation part 15 in the service-side apparatus 11 generates a conversion key for converting a first ciphertext encrypted with the service public key into a second ciphertext encrypted with the user public key without executing a decryption process. The matching part 16 in the service-side apparatus 11 matches the second ciphertext against the registered ciphertext.

One feature of the secure matching system according to the first example embodiment is that the service-side apparatus 11 generates a second ciphertext with the conversion key after generating a first ciphertext obtained by encrypting features used as a matching source with the service public key and matches the second ciphertext against a registered ciphertext. Concretely, upon receiving features used as an matching source, the service-side apparatus 11 first generates a first ciphertext by encrypting the features with the service public key generated by the service key generation part 14, and next converts the first ciphertext into a second ciphertext with a conversion key generated by the conversion key generation part 15 without executing a decryption process. Next, the matching part 16 executes secure matching by matching the second ciphertext against the registered ciphertext.

In the above description, upon receiving features used as a matching source, the service-side apparatus 11 first encrypts the features with the service public key without immediately executing a time-consuming matching process. In this way, the features received during the matching process will not be stored in a storage area in the service-side apparatus 11 as plaintexts for a long time. Thus, it is possible to prevent feature data in a storage area from being stolen and leaked by attacks from outside.

Another feature of the secure matching system according to the first example embodiment is that the conversion key generated by the conversion key generation part 15 in the service-side apparatus 11 contributes to high-speed and safe secure matching.

The conversion key directly converts the first ciphertext encrypted with the service public key into the second ciphertext encrypted with the user public key without a decryption process. In this way, the key conversion can be executed more quickly, compared with a case in which the plaintext is encrypted with the user public key or the ciphertext is first decrypted with the service secret key and is next encrypted with the user public key. Thus, the overall processing can be executed more quickly. In addition, it is possible to avoid a risk of attacks executed while the plaintext is temporarily stored in a storage area for decryption for the key conversion and to avoid a risk in terms of privacy such as leakage of the face of the person subjected to face authentication, for example.

[Proxy Re-Encryption]

A proxy re-encryption technique is used for the conversion key. The proxy re-encryption is a technique for converting a ciphertext based on one key into a ciphertext based on another key without obtaining plaintext information. Herein, the proxy re-encryption technique is used for converting a ciphertext based on the service public key of the service-side apparatus 11 into a ciphertext based on a user public key without executing a decryption process. The following example assumes that there are two pairs of public encryption keys, which are represented by (public key1, secret key1)=(pk1, sk1) and (public key2, secret key2)=(pk2, sk2). In order to execute the proxy re-encryption, a conversion key is generated. If the conversion key is represented by ReKey, the conversion key generation process rk=ReKeyGen( ) is represented by ReKeyGen (pk2, sk1)=rk1→2. Herein, pk2 is the public key of a second (conversion destination) ciphertext, and sk1 is the secret key of a first (conversion source) ciphertext.

Examples of the proxy re-encryption technique include not only a method in which the conversion key enables a one-way conversion as described above but also a method in which the conversion key enables a two-way conversion. In the latter case, as represented by ReKey Gen (sk1, sk2)=rk1←→2, a secret key for the conversion destination and a secret key for the conversion source are needed. In the secure matching system according to the present example embodiment, since it would be necessary to transmit the user secret key from the user-side apparatus 10 to the service-side apparatus 11, this method has a problem in security. Thus, it is desirable that the former one-way conversion model be adopted. Assuming that the features of an unencrypted plaintext are represented by M, the process with the conversion key is represented by ReEnc (rk1→2, Enc (pk1, M))=Enc(pk2, M).

Advantageous Effects

As described above, service keys are generated on the service side in the registration phase. After features used as a matching source are acquired in the matching phase, these features are first encrypted with the service public key. In this way, it is possible to shorten the time in which the input features remain as a plaintext, compared with a case in which an encryption process is directly executed for matching. In addition, the key conversion can be executed quickly without decrypting the data, by using the proxy re-encryption method. In this way, the features encrypted by the service-side apparatus 11 with the service public key can be processed without being decrypted until the matching phase, and therefore, both improving the security and ensuring the privacy can be achieved.

Hereinafter, concrete example embodiments will be described in more detail with reference to drawings. In the individual example embodiments, the same components will be denoted by the same reference characters, and description thereof will be omitted.

Second Example Embodiment

Figure 2:
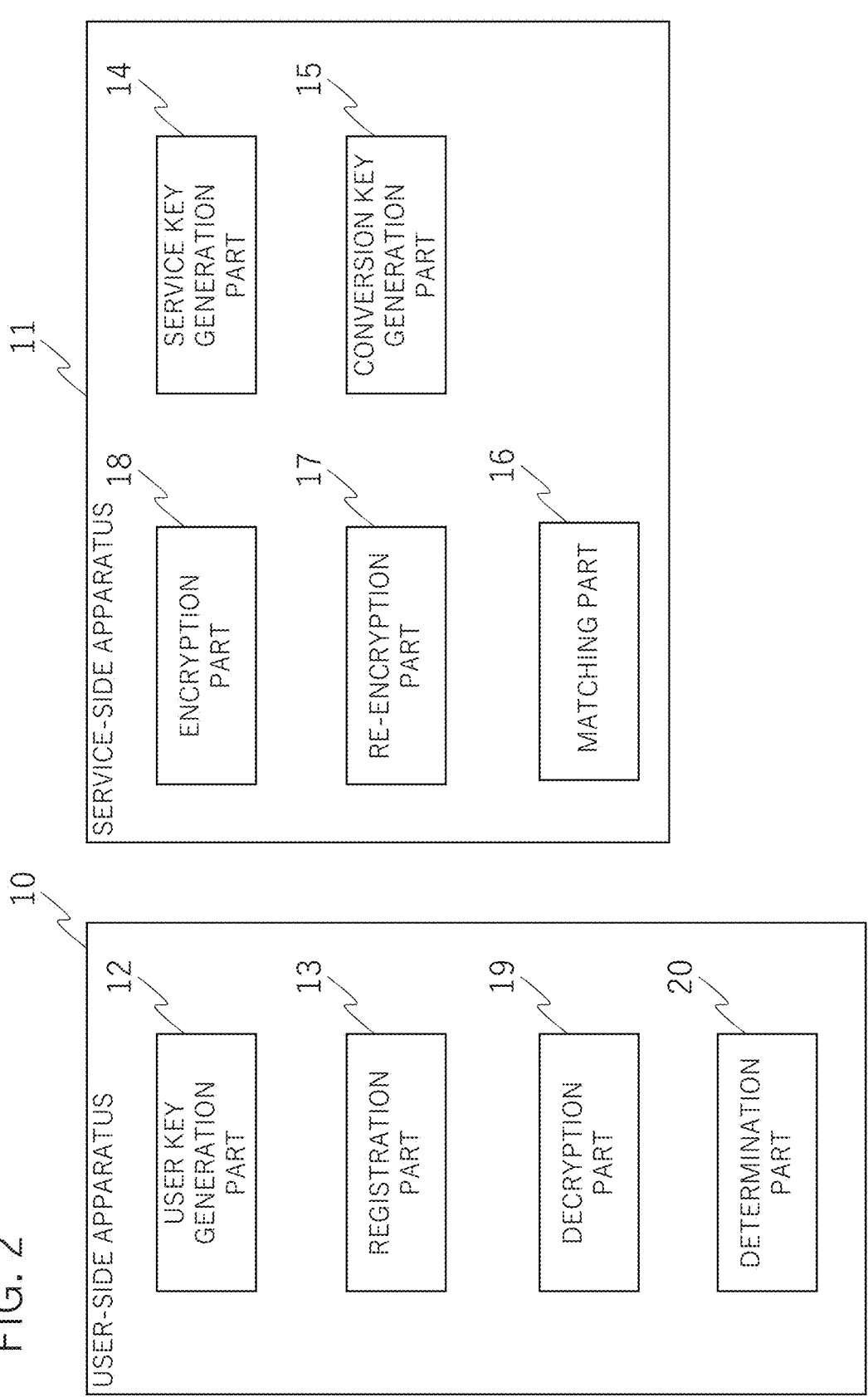
FIG. 2 is a block diagram illustrating a schematic configuration example of a secure matching system according to a second example embodiment.

In a second example embodiment, a secure matching system which has the above-described configuration and which enables similarity calculation using a homomorphic operation that can be executed while keeping a matching process secret will be described. FIG. 2 is a block diagram illustrating a schematic configuration example of the secure matching system according to the second example embodiment. As illustrated in FIG. 2, the secure matching system according to the present example embodiment includes a user-side apparatus 10 and a service-side apparatus 11. The user-side apparatus 10 includes a user key generation part 12, a registration part 13, a decryption part 19, and a determination part 20. The service-side apparatus 11 includes a service key generation part 14, a conversion key generation part 15, a matching part 16, a re-encryption part 17, and an encryption part 18.

The user key generation part 12 generates a pair of a user public key and a user secret key. Concretely, the user key generation part 12 generates a pair of a public key and a secret key by using an application program installed in a smartphone or the like of the user. Between the generated keys, the public key is transmitted to the service-side apparatus 11. While the encryption method is not limited to a particular method, in the secure matching system according to the present example embodiment, a determination process for determining whether to accept the recognition result is finally executed after the user-side apparatus 10 executes a decryption process with the secret key. Thus, if the system is applied to determination of personal identification or the like executed for entrance and exit management or the like, an immediate operation is needed, and therefore, a quick process is needed. Thus, it is desirable that a method or a key length that enables a relatively quick decryption process be used.

The registration part 13 registers a registration ciphertext obtained by encrypting a plurality of features used as a matching destination with a corresponding user public key in the service-side apparatus 11. The "matching destination" is the query destination in the matching phase, and represents features belonging to the user registered in an entrance and exit management server included in the service-side apparatus. After the features acquired by the registration part 13 are encrypted with the corresponding user public key, the features are stored as a registered ciphertext in a storage area in the service-side apparatus 11. Thus, the registration part 13 may belong to the service-side apparatus 11.

The service key generation part 14 generates a pair of a service public key and a service secret key. This "service" refers to the service-side apparatus 11, and the generated service secret key is stored in the service-side apparatus 11. The service public key is used by the encryption part 18, which will be described below, to encrypt the features used as a matching source.

The conversion key generation part 15 generates a conversion key for converting a first ciphertext encrypted with the service public key into a second ciphertext encrypted with the user public key without executing a decryption process, by using the user public key and the service secret key. The conversion key is generated by using the above-described proxy re-encryption technique, and is stored in a storage area in the service-side apparatus 11.

The encryption part 18 receives features used as a matching source, and generates a first ciphertext by encrypting the features with the service public key. For example, in the case of face authentication, the features used as the matching source are features extracted from a face image captured by a camera or the like. The features are encrypted by the service-side apparatus 11 with the service public key. Normally, in order to match features against the registered ciphertexts, the features need to be encrypted with the same user public keys as those used for the registered ciphertexts. However, in this way, as will be described below, the features need to be encrypted with the public keys of all the users for matching, and the encryption process needs to be executed a plurality of times equal to the number of registered users. Thus, the process takes time. If the process takes time, the features remain as plaintexts for a long time in a memory or the like in the service-side apparatus 11. This increases the possibility that the features will be stolen by an attack from the outside. In order to avoid this, in the secure matching system according to the present example embodiment, the acquired matching-source features are first encrypted with the service public key such that the time in which the features remain as a plaintext is shortened.

The re-encryption part 17 converts the first ciphertext into the second ciphertext with the conversion key. This conversion uses the conversion key generated by the above-described proxy re-encryption method. Concretely, the re-encryption part 17 converts the features of an individual user encrypted by the encryption part 18 with the service public key into a ciphertext encrypted with the public key of the individual user for matching, as is the case with the registered ciphertext. Since the secure matching system according to the present example embodiment uses the proxy re-encryption technique, the secure matching system is characterized in that the key for the conversion from a first ciphertext into a second ciphertext is directly converted, without decrypting the first ciphertext and encrypting the decrypted data again.

For each set of features used as a matching source and belonging to a user, the re-encryption part 17 generates ciphertexts by conversions, the number of ciphertexts matches the number of users who have registered their respective ciphertexts. At the timing when the service-side apparatus 11 acquires matching-source features, the service-side apparatus 11 cannot determine the user to which the features belong. That is, the re-encryption part 17 cannot determine which public key needs to be used to encrypt the features to generate a second ciphertext. The user to which the features belong will be determined in the matching phase executed later.

The matching part 16 matches the second ciphertexts against the registered ciphertexts. Concretely, when N users are registered in the present system, N second ciphertexts are generated for each set of features used as a matching source. The matching part 16 matches the N second ciphertexts against the N registered ciphertexts. The matching part 16 executes the matching by using homomorphic similarity calculations while keeping the features encrypted.

[Homomorphic Similarity Calculation]

The matching can be executed by calculating the similarity indicating how close two sets of features are to each other. Use of a homomorphic operation enables calculation of the similarity between encrypted features. In the case of (public key, secret key)=(pk, sk), encryption of the original features can be represented by Enc(pk, M), and decryption of the encrypted features can be represented by Dec(sk, c). The homomorphic similarity operation is represented by EncSim(Enc(pk, x), Enc(pk, y))=Enc(pk, D(x, y)), in which D(x, y) represents the similarity (distance) between x and y. In the case of authentication of personal identification, an acceptable range is set. If D(x, y) falls within the acceptable range, "acceptable" (OK) is determined. Otherwise, "not acceptable" (NG) is determined. As describe above, by executing a homomorphic operation, it is possible to calculate the similarity between sets of encrypted features without decrypting the encrypted features.

In this way, when the determination source features reach the user-side apparatus 10, the features are encrypted with the service public key, key conversion is executed, and matching is executed by executing a similarity calculation. The features are kept encrypted and secret until immediately before acceptance or non-acceptance is finally determined. Thus, the present example embodiment provides high-level security against stealing, etc., by attacks from the outside. In addition, once features are encrypted, no one can directly view the features. Therefore, because it is possible to protect the features from the eyes of anyone, high-level protection can be achieved in terms of privacy.

Because a homomorphic similarity calculation does not succeed unless data encrypted with the same key is used. Thus, in the similarity calculation, for each set of features used as a matching source, among the N×N second cipher-texts generated with all the conversion keys, only one of the N ciphertexts generated with a single conversion key is finally obtained as the ciphertext generated with the same public key. As a result, the number N of similarity calcula-tions are generated. The generated similarity calculation results in an encrypted state are transmitted to the user-side apparatus 10.

The decryption part 19 decrypts the encrypted similarities by using the user secret key of the user-side apparatus 10. The user-side apparatus 10 receives the similarity calcula-tion results transmitted from the service-side apparatus 11, and decrypts the similarities by using its stored user secret key. If N people are registered in the system, the number of decryption results is also N.

The determination part 20 determines whether each of the similarities decrypted by the user-side apparatus 10 falls within an acceptable range. This "acceptable range" corre-sponds to an error 0 or an error that is not 0 but falls within a predetermined acceptable range. When the acceptable range is wide, even if the feature error is somewhat large, the error falls within this acceptable range, and therefore, a smaller number of errors occur when personal identification is executed. However, when the acceptable range is too wide, features of a different person could fall within the acceptable range. In this case, a user who is not supposed to accept could be accepted. In this case, for example, if a plurality of sets of features fall within the acceptable range, the similarities may be ranked among the sets of features that fall within the acceptable range, and the user to which the features representing the highest similarity belong may be accepted, for example. On the other hand, when the accept-able range is too narrow, there will be more cases in which the features of the authentic person could result in an error because of a little noise, whereby the convenience is dete-riorated. Thus, regarding the acceptable range, it is neces-sary to adjust parameters defining the acceptable range such that the system can be operated appropriately.

Another Configuration of Example Embodiment 2

Figure 3:
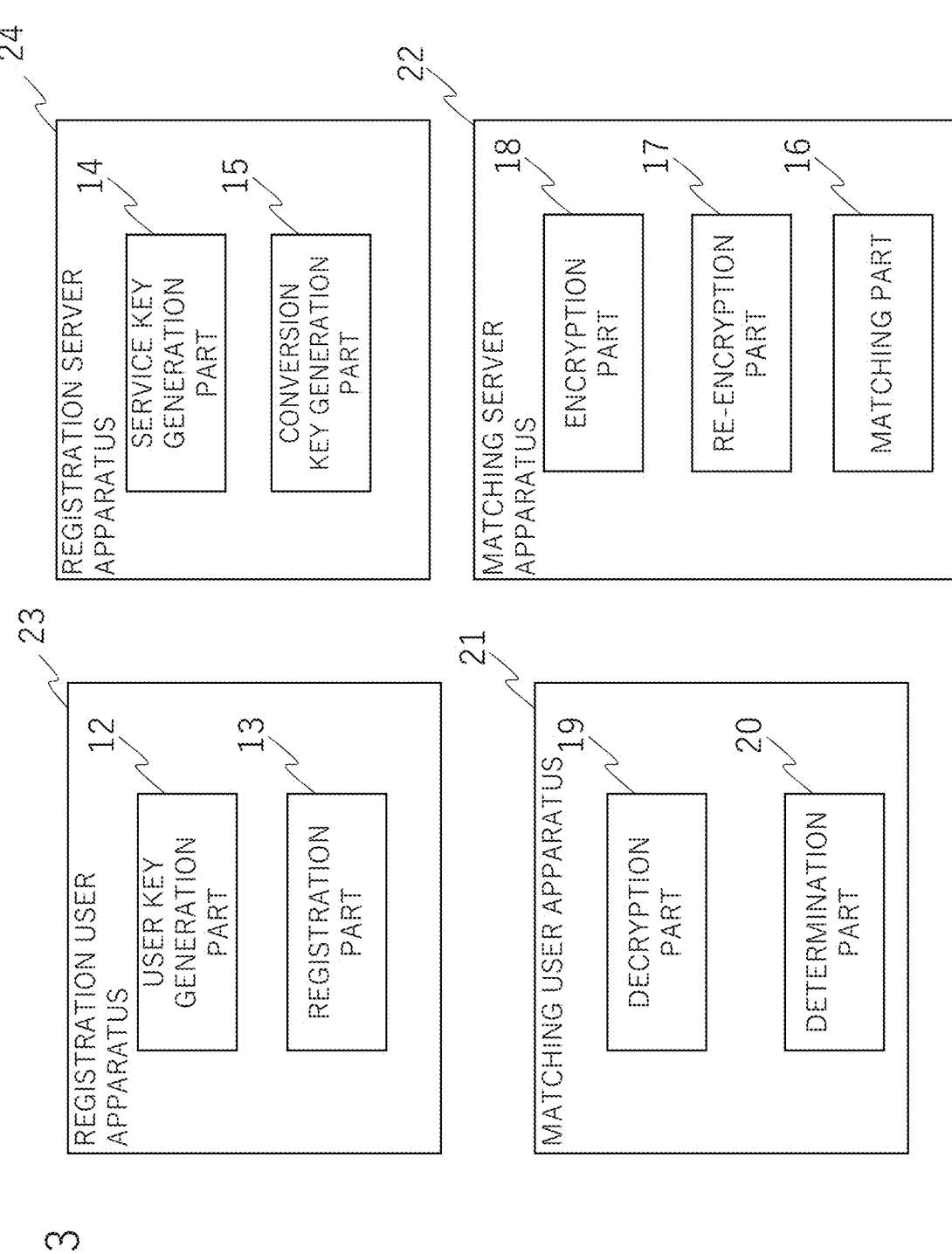
FIG. 3 is a block diagram illustrating another schematic configuration example of the secure matching system according to the second example embodiment.

The above-described user-side apparatus 10 and service-side apparatus 11 can each be divided based on the regis-tration phase and the matching phase of the system opera-tion. FIG. 3 is a diagram illustrating another configuration in which the apparatus configuration according to the example embodiment 2 is further divided based on the registration phase and the matching phase. That is, the configuration includes a matching user apparatus 21, a matching server apparatus 22, a registration user apparatus 23, and a regis-tration server apparatus 24.

In the configuration in FIG. 3, the matching user appa-ratus 21 includes a decryption part 19 and a determination part 20. The matching server apparatus 22 includes an encryption part 18, a re-encryption part 17, and a matching part 16. The registration user apparatus 23 includes a user key generation part 12 and a registration part 13. The registration server apparatus 24 includes a service key generation part 14 and a conversion key generation part 15. Particularly, by installing the matching server apparatus on the server apparatus side as a separate apparatus, for example, the matching server apparatus can be disposed at a different location on the network or the apparatus operation can be stopped in the matching phase after the registration phase. In this way, it is possible to prevent a secret key from being stolen by an attack. As a result, the security is improved.

[Operation]

Figure 4:
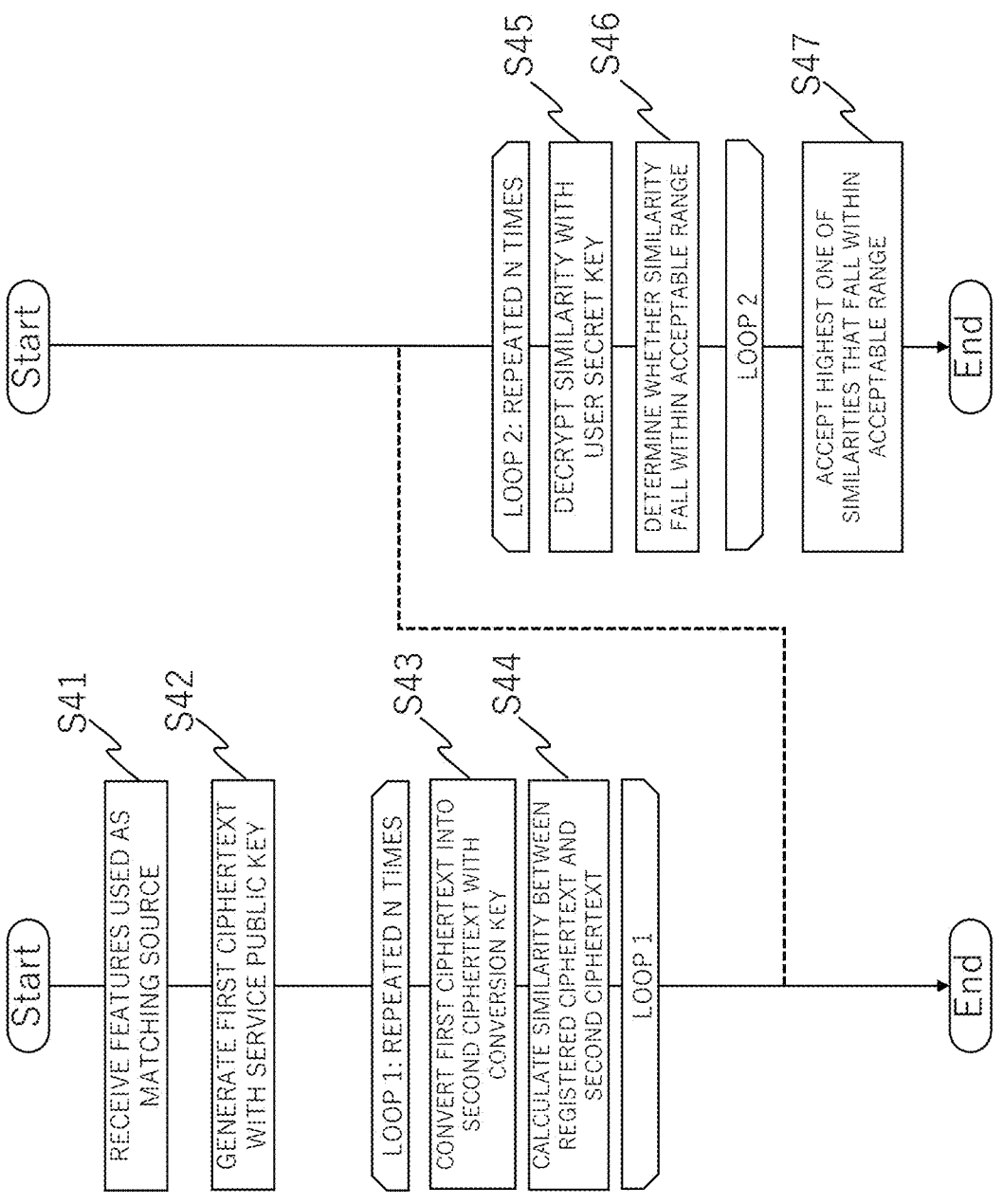
FIG. 4 is a system flowchart illustrating a process executed by the secure matching system according to the second example embodiment.

Next, an outline of an operation of the secure matching system according to the present example embodiment will be described. The description of the process in the registra-tion phase such as registration of a registration ciphertext and generation of keys will be omitted. FIG. 4 is a flowchart of the matching phase in the secure matching system accord-ing to the second example embodiment. The left side chart illustrates the process executed by the service-side apparatus 11, and the right side chart illustrates the process executed by the user-side apparatus 10. As illustrated in the left side chart, in the matching phase, first, the service-side apparatus 11 receives features used as a matching source (step S41). Next, the service-side apparatus 11 generates a first cipher-text with the service public key (step S42). Next, the service-side apparatus 11 converts the first ciphertext into a second ciphertext with the conversion key (step S43). Next, the service-side apparatus 11 calculates the similarity between the registered ciphertext and the second ciphertext (step S44). If the number of registered ciphertexts, that is, the number of sets of features of registered matching des-tinations, is N, step S43 and step S44 are repeated N times (loop 1). Herein, step S43 may be repeated N times first, and step S44 may be repeated N times next.

Next, the process on the right side chart is executed by the user-side apparatus 10. The portions connected by a dotted line on the charts indicate the same time point. Before the process by the user-side apparatus 10 is started, the N encrypted similarities calculated are transmitted from the service-side apparatus 11 to the user-side apparatus 10. The user-side apparatus 10 decrypts a transmitted similarity with the user secret key (step S45). Next, whether the decrypted similarity falls within an acceptable range is determined (step S46). Step S45 and step S46 are repeated N times, that is, step S45 and step S46 are repeated a number of times equal to the number N of encrypted similarities transmitted (loop 2). Herein, step S45 may be repeated N times first, and step S46 may be repeated N times next. If any of the similarities falls within the acceptable range, the user-side apparatus 10 may transmit an OK notification to the system. When there are registered ciphertexts that fall within the acceptable range, other information may also be transmitted in addition to an OK or NG notification. That is, when it is necessary to determine matching registered ciphertexts, the similarities may be ranked among the registered ciphertexts that fall within the acceptable range, and a registered cipher-text indicating the highest similarity may be accepted (step S47).

[Hardware Configuration]

Figure 5:
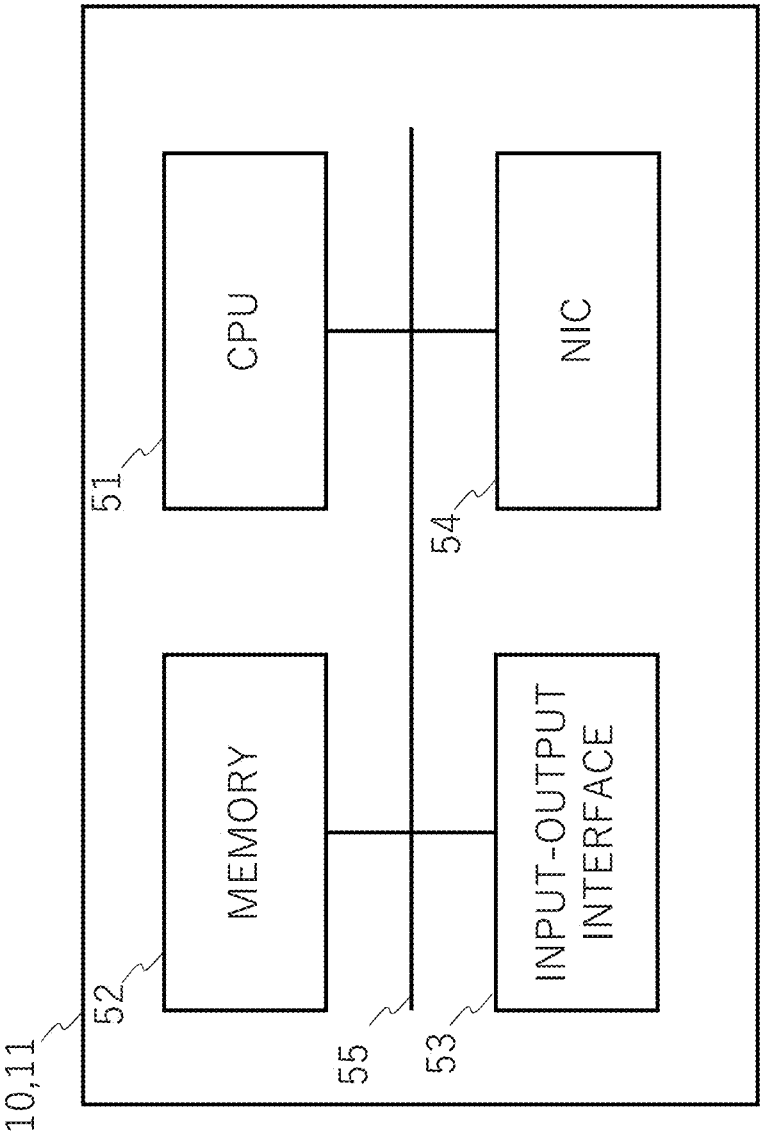
FIG. 5 is a diagram illustrating a hardware configuration example of the secure matching system according to the second example embodiment.

The secure matching system according to the present example embodiment can be constituted by an information processing apparatus (a computer), and has a configuration illustrated as an example in FIG. 5. For example, the user-side apparatus 10 and the service-side apparatus 11 each include, for example, a central processing unit (CPU) 51, a memory 52, an input-output interface 53, and a network interface card (NIC) 54 serving as communication means, all of which are mutually connected by an internal bus 55.

The configuration illustrated in FIG. 5 does not limit the hardware configuration of the user-side apparatus 10 and the service-side apparatus 11. The user-side apparatus 10 and the service-side apparatus 11 may include hardware not illustrated or may be configured without the input-output interface 53 as needed. In addition, the number of CPUs or the like included in each of the user-side apparatus 10 and the service-side apparatus 11 is not limited to the example illustrated in FIG. 5. For example, a plurality of CPUs may be included in each of the user-side apparatus 10 and the service-side apparatus 11.

The memory 52 is a random access memory (RAM), a read-only memory (ROM), or an auxiliary storage device (a hard disk or the like).

The input-output interface 53 is means serving as an interface for a display device or an input device not illustrated. The display device is, for example, a liquid crystal display or the like. The input device is, for example, a device such as a keyboard or a mouse for receiving user operations.

The functions of the user-side apparatus 10 and the service-side apparatus 11 are realized by a group of programs (processing modules) such as a user key generation program, a registration program, a decryption program, a determination program, a service key generation program, a conversion key generation program, an encryption program, a re-encryption program, and a matching program stored in the memory 52 and a group of data such as various kinds of key data generated and feature data of registered ciphertexts stored in the memory 52 by the registration program and used by the matching program. For example, the processing modules are realized when the CPU 51 executes the individual programs stored in the memory 52. In addition, the individual program can be updated by downloading a program update via a network or by using a storage medium storing a program update. In addition, the processing modules may be realized by semiconductor chips. That is, the user-side apparatus 10 and the service-side apparatus 11 each have means for executing the functions of the above-described processing modules by using some hardware and/or software.

[Hardware Operation]

[Registration Phase]

In the registration phase, first, the user key generation program and the service key generation program are invoked from the memories 52 of their respective apparatuses, and become executable by their respective CPUs 51 to generate keys. The generated pairs of secret keys and public keys are stored in the memories 52 of their respective apparatuses. Next, the registration program is invoked from the memory 52 and becomes executable by the CPU 51. This program controls the input-output interface for a camera or the like, acquires feature data to be stored as a registered ciphertext, encrypts the data with the user public key, and stores the encrypted data in the memory 52. This process is repeated N times, and N is the number of registered users. As the same time, the conversion key generation program is invoked from the memory 52, becomes executable by the CPU 51, generates a conversion key by using the user public key data stored in the memory 52 in the user-side apparatus 10 and the service secret key data stored in the memory 52 in the service-side apparatus 11, and stores the conversion key in the memory 52 in the service-side apparatus 11. This process is repeated N times, and N is the number of sets of feature data of the registered ciphertexts. The N conversion key data is stored in the memory 52 in the service-side apparatus 11.

[Matching Phase]

In the matching phase, the encryption program is invoked from the memory 52 in the service-side apparatus 11, and becomes executable by the CPU 51. This program controls the input-output interface 53 for a camera or the like, receives features used as a matching source, encrypts the features with the service public key stored in the memory 52, and stores the encrypted features as a first ciphertext in the memory 52. Next, the conversion program is invoked from the memory 52 and becomes executable by the CPU 51. This program reads the N conversion key data sequentially, encrypts the first ciphertext data stored in the memory 52, outputs the encrypted data as the second ciphertext, and temporarily stores the second ciphertext in the memory 52. Next, the matching program is invoked from the memory 52, and becomes executable by the CPU 51. This program executes an operation for calculating the similarity between the second ciphertext data temporarily stored in the memory 52 and the N registered ciphertext data stored in the memory 52. This operation may be a homomorphic similarity calculation for calculating the distance between these two kinds of features. The process is repeated N times, which is the number of conversion keys. However, because the homomorphic operation for the similarity calculation does not succeed unless the same key is used, the similarity is actually calculated only once for each conversion key when a matching user public key is used. Because this operation is executed for each of the N conversion keys, N encrypted similarity data is generated in total. The service-side apparatus 11 transmits the data to the user-side apparatus 10 via its NIC 54.

The user-side apparatus 10 receives the N encrypted similarity data via its NIC 54, and the similarity data is given to the decryption program, which has been invoked from the memory 52 and has become executable by the CPU 51. This program reads the user secret key data and decrypts the encrypted similarity data. Next, the determination program is invoked from the memory 52 and becomes executable by the CPU 51. This program first reads threshold data defining an acceptable range from the memory 52. Next, the program reads the decrypted plaintext similarity data, and determines whether the individual similarity exceeds the threshold data defining the acceptable range. This is repeated N times, which is the number of similarity data. If there is similarity data that falls within the acceptable range, the determination program transmits an OK message to the service-side apparatus 11 via its NIC 54. If there is no similarity data that falls within the acceptable range, the determination program transmits an NG message to the service-side apparatus 11 via its NIC 54.

For example, when it is necessary to execute not only personal authentication but also individual recognition, if a plurality of data falls within the acceptable range, the determination program may sort the calculated similarity data in ascending or descending order. In this case, the user-side apparatus 10 accepts the registered ciphertext having features representing the highest similarity, and transmits an identifier of the accepted registered ciphertext to the service-side apparatus 11 via its NIC 54.

Advantageous Effects

As described above, by executing homomorphic similarity calculations in the matching phase, it is possible to execute the similarity calculation between inputted encrypted features as a matching source and the registered ciphertexts registered as the matching destinations while keeping the features secret.

EXAMPLE

Figure 6:
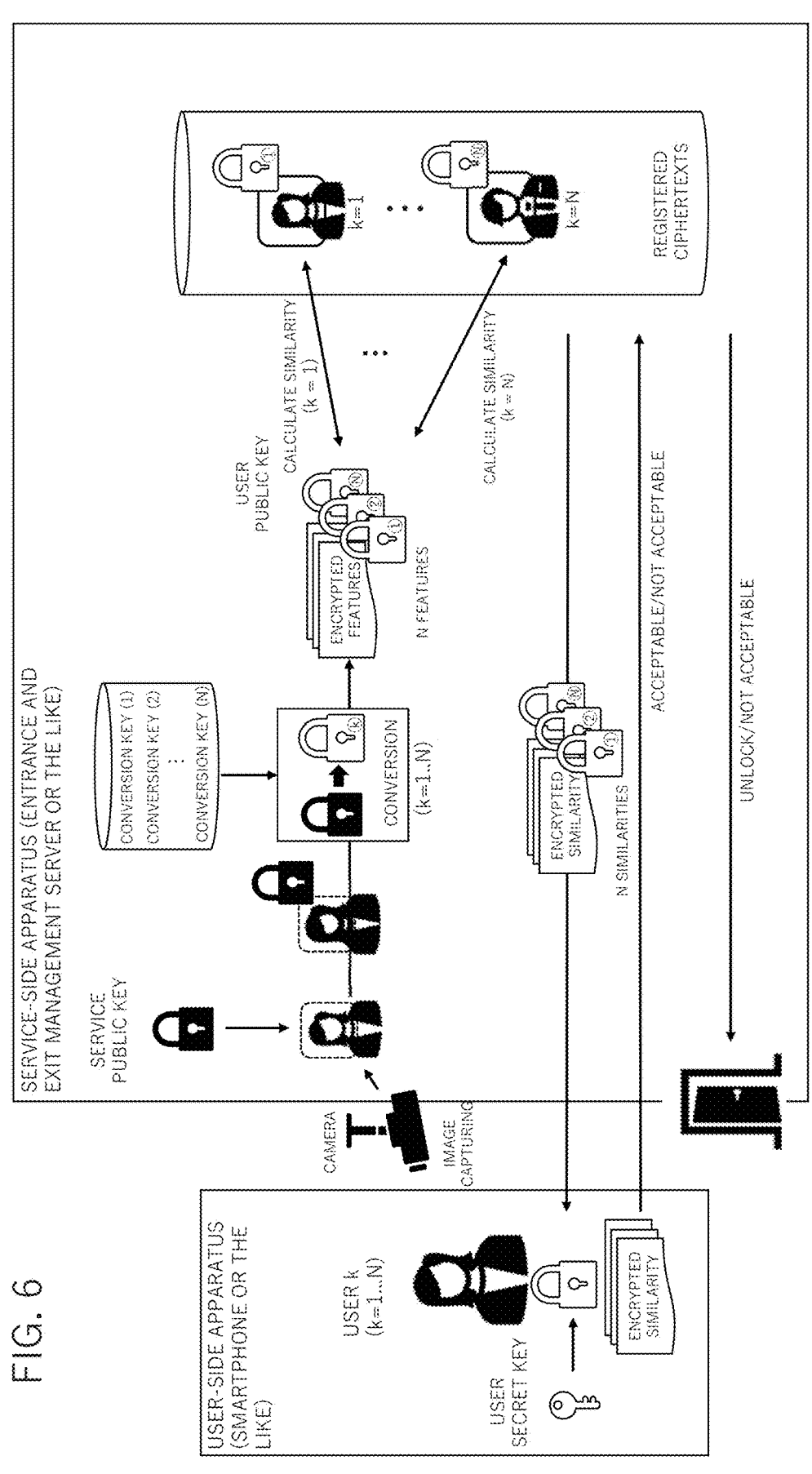
FIG. 6 is a diagram illustrating an example of the present invention.

FIG. 6 is a schematic diagram illustrating an outline of a process in a secure matching system according to an example of the present invention. The secure matching system according to the present disclose can be used for various purposes. In the present example, as an example, a case to which the invention according to the present disclosure is applied as an entrance and exit management system will be described. As illustrated in FIG. 6, an entrance and exit system including a user-side apparatus and a service-side apparatus is constituted. The user-side apparatus is, for example, a smartphone or the like possessed by a user. The service-side apparatus includes, for example, an entrance and exit management server, a camera connected to the apparatus, and an electronic lock of a door controlled by the apparatus.

Keys needed for the system operation are generated. First, an individual user generates a user secret key and a user public key on his or her smartphone serving as the user-side apparatus. The generated public key is transmitted to the entrance and exit management server of the service-side apparatus, and is stored in a storage area. The entrance and exit management server of the service-side apparatus generates a service secret key and a public key, and generates a conversion key by using the user public key transmitted from the user-side apparatus and the service secret key. The generated keys are stored in a storage area.

In addition to the key generation, it is necessary to register features in the entrance and exit management server as a registered ciphertext used for matching of the user in advance. For example, an image of the face may be captured with a camera of the smartphone and may be registered in the server. The registered features are encrypted with the user public key generated and stored, and stored in a storage area as a registered ciphertext.

Upon completion of the above-described process, the user can use the system. An operation executed to determine whether the user is allowed to enter the target room will be described. The service-side apparatus includes a camera used for entrance and exit management. When the user comes close to this camera and the user's face enters the camera's shooting range, the camera captures an image of the user's face, and the entrance and the exit management server acquires the image, executes pre-processing such as extracting the face image for matching as needed, and uses the image as the matching source features. Upon acquisition of the features, the entrance and exit management server apparatus invokes the service public key and encrypts the features. Because the features acquired in this way are data encrypted from a plaintext, the features are relatively safe against attacks from the outside.

Next, the encryption key used for the encrypted features is converted with a conversion key using a proxy re-encryption technique. As a result, the encrypted features become a ciphertext obtained by using the user public key. At this point, the entrance and exit management server cannot determine which user public key corresponds to the conversion source features. Thus, when N users are registered, N encrypted data is generated with N conversion keys. The generated N encrypted data are matched against the N registered ciphertexts. In this phase, because only the data encrypted with the same key matches, N matching results are obtained from the encrypted data based on the same public key as the actual matching result.

The matching is executed by encrypted homomorphic operations, and the calculated encrypted similarities are transmitted to the smartphone or the like serving as the user-side apparatus. The user-side apparatus decrypts the encrypted similarities with its stored user secret key. Regarding the decrypted similarities, in the determination process, the user-side apparatus determines whether each similarity falls within a predetermined acceptable range. As a result of the determination, if at least one similarity falls within the acceptable range, the user-side apparatus transmits an OK message to the entrance and exit management server of the service-side apparatus. Upon reception of the message, the entrance and exit management server unlocks the electronic lock. In this way, the registered user can enter the room. As a result of the determination, if none of the similarities falls within the acceptable range, the user-side apparatus transmits an NG message to the entrance and exit management server. In this case, instead of unlocking the electronic lock, the entrance and exit management server presents an error alarm, for example.

The above-described example embodiments can be entirely or partly described, but not limited to, as the following notes.

[Note 1]

See the (secure) matching system according to the above-described first aspect.

[Note 2]

The (secure) matching system preferably according to note 1; wherein the service-side apparatus further includes an encryption part that receives features used as a matching source, and obtains a first ciphertext by encrypting the features with the service public key, and a re-encryption part that converts the first ciphertext into a second ciphertext with the conversion key.

[Note 3]

The (secure) matching system preferably according to note 1 or 2; wherein, by using a user public key and the service secret key, the conversion key generation part generates a conversion key for converting a first ciphertext encrypted with the service public key into a second ciphertext encrypted with the user public key without executing a decryption process.

[Note 4]

The (secure) matching system preferably according to any one of notes 1 to 3;

wherein the matching part in the service-side apparatus calculates a similarity between the registered ciphertext and the second ciphertext while keeping these encrypted data secret; and wherein the user-side apparatus further includes a decryption part that decrypts the encrypted similarity by using the user secret key, and a determination part that determines whether the decrypted similarity falls within an acceptable range.

[Note 5]

The (secure) matching system preferably according to any one notes 1 to 4;

wherein at least the second ciphertext is based on a fully homomorphic encryption in which a homomorphic operation is defined regarding a plurality of multiplications and additions; and wherein the matching part obtains a similarity by calculating a distance between features based on the registered ciphertext and features based on the second ciphertext through a homomorphic operation.

[Note 6]

The (secure) matching system preferably according to note 4, including:

a registration user apparatus including the user key generation part and the registration part;

a registration server apparatus including the service key generation part and the conversion key generation part;

a matching server apparatus including the encryption part, the re-encryption part, and the matching part; and a matching user apparatus including the decryption part and the determination part.

[Note 7]

See the (secure) matching apparatus according to the above-described second aspect.

[Note 8]

See the (secure) matching method according to the above-described third aspect.

[Note 9]

The (secure) matching method preferably according to note 8;

wherein, in the step of matching, a similarity between the registered ciphertext and the second ciphertext is calculated with these encrypted data kept secret; and wherein the matching method further includes:

a decryption step of decrypting the encrypted similarity by using the user secret key; and a step of determining whether the decrypted similarity falls within an acceptable range.

[Note 10]

See the program according to the above-described fourth aspect.

The disclosure of the above NPLs, etc., which have been referred to, is incorporated herein by reference thereto. Modifications and adjustments of the example embodiments and examples are possible within the scope of the overall disclosure (including the claims) of the present invention and based on the basic technical idea of the present invention. Various combinations and selections (including partial deletions) of various disclosed elements (including the elements in each of the claims, example embodiments, examples, drawings, etc.) are possible within the scope of the overall disclosure of the present invention. That is, the present invention of course includes various variations and modifications that could be made by those skilled in the art according to the overall disclosure including the claims and the technical idea. The specification discloses numerical value ranges. However, even if the specification does not particularly disclose numerical values or small ranges included in the ranges, these values and ranges should be deemed to have been specifically disclosed. In addition, as needed and based on the gist of the present invention, partial or entire use of the individual disclosed matters in the above literatures that have been referred to in combination with what is disclosed in the present application should be deemed to be included in what is disclosed in the present application, as part of the disclosure of the present invention.

REFERENCE SIGNS LIST 10 user-side apparatus
11 service-side apparatus

16

12 user key generation part
13 registration part
14 service key generation part
15 conversion key generation part
16 matching part
17 re-encryption part
18 encryption part
19 decryption part
20 determination part
21 matching user apparatus
22 matching server apparatus
23 registration user apparatus
24 registration server apparatus
51 CPU
52 memory
53 input-output interface
54 NIC
55 internal bus

What is claimed is:

1. A matching system, comprising:

a user-side apparatus; and a service-side apparatus;

wherein the user-side apparatus includes:

a user key generation part that generates a pair of a user public key and a user secret key, and a registration part that registers a registration ciphertext obtained by encrypting a plurality of features used as a matching destination with the user public key in the service-side apparatus;

wherein the service-side apparatus includes:

a service key generation part that generates a pair of a service public key and a service secret key, a conversion key generation part that generates a conversion key for converting a first ciphertext encrypted with the service public key into a second ciphertext encrypted with the user public key without executing a decryption process, and a matching part that matches the second ciphertext against the registered ciphertext; and wherein the service-side apparatus generates a second ciphertext with the conversion key after generating a first ciphertext obtained by encrypting features used as a matching source with the service public key and matches the second ciphertext against a registered ciphertext.

2. The matching system according to claim 1; wherein the service-side apparatus further includes an encryption part that receives features used as a matching source, and obtains a first ciphertext by encrypting the features with the service public key, and a re-encryption part that converts the first ciphertext into a second ciphertext with the conversion key.

3. The matching system according to claim 1; wherein, the conversion key generation part generates the conversion key by using a user public key and the service secret key.

4. The matching system according to claim 1;

wherein the matching part in the service-side apparatus calculates a similarity between the registered ciphertext and the second ciphertext while keeping these encrypted data secret; and wherein the user-side apparatus further includes:

a decryption part that decrypts the encrypted similarity by using the user secret key, and a determination part that determines whether the decrypted similarity falls within an acceptable range.

5. The matching system according to claim 4;

wherein at least the second ciphertext is based on a fully homomorphic encryption in which a homomorphic operation is defined regarding a plurality of multiplications and additions; and wherein the matching part obtains a similarity by calculating a distance between features based on the registered ciphertext and features based on the second ciphertext through a homomorphic operation.

6. The matching system according to claim 4, comprising:

a registration user apparatus including the user key generation part and the registration part;

a registration server apparatus including the service key generation part and the conversion key generation part;

a matching server apparatus including the encryption part, the re-encryption part, and the matching part; and a matching user apparatus including the decryption part and the determination part.

7. A matching apparatus, comprising:

a service key generation part that generates a pair of a service public key and a service secret key;

a conversion key generation part that generates, by using a plurality of user public keys and the service secret key, conversion keys, each of which is for converting a first ciphertext encrypted with the service public key into a second ciphertext encrypted with a corresponding one of the user public keys without executing a decryption process;

a registration part that obtains a registration ciphertext by encrypting a plurality of features used as a matching destination with a corresponding user public key;

an encryption part that receives matching target features and obtains a first ciphertext by encrypting the features with the service public key;

a re-encryption part that converts the first ciphertext into the second ciphertext with the conversion key; and a matching part that matches the second ciphertext against the registered ciphertext.

8. A matching method, comprising:

generating a pair of a user public key and a user secret key;

generating a pair of a service public key and a service secret key;

generating a conversion key for converting a first ciphertext encrypted with the service public key into a second ciphertext encrypted with the user public key without executing a decryption process;

obtaining a registration ciphertext by encrypting a plurality of features used as a matching destination with the user public key;

receiving features used as a matching source, and obtaining the first ciphertext by encrypting the features with the service public key;

converting the first ciphertext into the second ciphertext with the conversion key; and matching the second ciphertext against the registered ciphertext.

9. The matching method according to claim 8;

wherein, in the matching process, a similarity between the registered ciphertext and the second ciphertext is calculated with these encrypted data kept secret; and wherein the matching method further includes:

decrypting the encrypted similarity by using the user secret key; and determining whether the decrypted similarity falls within an acceptable range.

10. A non-transitory computer readable medium storing a program, causing a computer to execute:

processing for generating a pair of a user public key and a user secret key;

processing for generating a pair of a service public key and a service secret key;

processing for generating a conversion key for converting a first ciphertext encrypted with the service public key into a second ciphertext encrypted with the user public key without executing a decryption process;

processing for obtaining a registration ciphertext by encrypting a plurality of features used as a matching candidate with the user public key;

processing for receiving features used as a matching target, and obtaining the first ciphertext by encrypting the features with the service public key;

processing for converting the first ciphertext into the second ciphertext with the conversion key; and processing for matching the second ciphertext against the registered ciphertext.

11. The matching apparatus according to claim 7; further comprising:

an encryption part that receives features used as a matching source, and obtains a first ciphertext by encrypting the features with the service public key, and a re-encryption part that converts the first ciphertext into a second ciphertext with the conversion key.

12. The matching apparatus according to claim 7; wherein the matching part calculates a similarity between the registered ciphertext and the second ciphertext while keeping these encrypted data secret.

13. The matching apparatus according to claim 12;

wherein at least the second ciphertext is based on a fully homomorphic encryption in which a homomorphic operation is defined regarding a plurality of multiplications and additions; and wherein the matching part obtains a similarity by calculating a distance between features based on the registered ciphertext and features based on the second ciphertext through a homomorphic operation.

14. The matching method according to claim 8; wherein the conversion key is generated by using a user public key and the service secret key.

15. The matching method according to claim 8;

wherein at least the second ciphertext is based on a fully homomorphic encryption in which a homomorphic operation is defined regarding a plurality of multiplications and additions; and wherein a similarity is obtained by calculating a distance between features based on the registered ciphertext and features based on the second ciphertext through a homomorphic operation.

16. The non-transitory computer readable medium storing the program according to claim 10;

wherein, in the processing for matching, a similarity between the registered ciphertext and the second ciphertext is calculated with these encrypted data kept secret; and wherein the program further causing a computer to execute:

processing for decrypting the encrypted similarity by using the user secret key; and processing for determining whether the decrypted similarity falls within an acceptable range.

17. The non-transitory computer readable medium storing the program according to claim 10; wherein the conversion key is generated by using a user public key and the service secret key.

18. The non-transitory computer readable medium storing the program according to claim 10;

wherein at least the second ciphertext is based on a fully homomorphic encryption in which a homomorphic operation is defined regarding a plurality of multiplications and additions; and wherein a similarity is obtained by calculating a distance between features based on the registered ciphertext and features based on the second ciphertext through a homomorphic operation.

* * * * *